United States Patent Office 2,886,568
Patented May 12, 1959

2,886,568

PREPARATION OF QUINOLINES

Harry A. Stansbury, Jr., and Herman F. Lykins, Charleston, W. Va., assignors to Union Carbide Corporation, a corporation of New York No Drawing. Application October 16, 1956
Serial No. 616,122

7 Claims. (Cl. 260—283)

The present invention relates to aromatic nitrogen heterocycles, and more particularly to a novel process for the production of quinoline and certain substituted quinoline derivatives.

Many quinoline compounds, and particularly certain hydroxy substituted quinolines, have recently acquired increased importance as intermediates in the production of protective agents, such as antimalarials, fungicides, and pesticides. For example, the copper salt of 8-hydroxyquinoline is frequently employed as a preservative for textile fabrics in tropical climates, and as an aid in the control of plant disease.

Standard processes for the synthesis of quinoline and substituted quinolines generally involve reacting aniline or a substituted aniline derivative with acrolein or glycerin, in the presence of a mineral acid, and an oxidizing agent, such as arsenic oxide, iron oxide or an aromatic nitro compound, e.g. nitrophenol, or nitrobenzene. The utilization of oxidizing steps in these conventional processes, however, ordinarily necessitates the maintenance of a carefully controlled reaction temperature, over, a narrowly limited temperature range. Moreover additional separation techniques for the removal of the oxidizing agent, or its derivative formed in the reaction, are usually required prior to the recovery of the desired product. These processes, therefore, often represent inconvenient or extensive operations.

The present invention has as its object the provision of a novel and convenient process for the synthesis of quinoline and substituted quinoline derivatives, wherein the utilization of an oxidizing agent, or procedure, is not required.

According to the invention, quinoline compounds corresponding to the general formula:

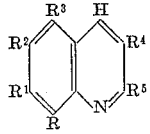

wherein R, $R^1$, $R^2$ and $R^3$ represent hydrogen, hydroxy, alkyl, alkoxy, phenyl, halogen, or nitro radicals, and $R^4$ and $R^5$ represent hydrogen or alkyl radicals, may be synthesized by reacting an aniline compound corresponding to the general formula:

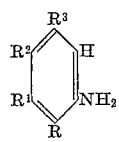

wherein R, $R^1$, $R^2$ and $R^3$ are as defined above, with an alpha-, beta-dihalo, saturated aliphatic compound corresponding to the general formula:

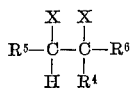

wherein X is a chlorine or bromine atom, $R^4$ and $R^5$ are as defined above, and $R^6$ represents a formyl, [—CHO], dialkoxymethyl, [—CH$(OR^7)_2$], or diacyloxymethyl, [—CH$(OCOR^7)_2$] radical in which $R^7$ is an alkyl group. The reaction is necessarily carried out in the presence of a mineral acid, such as phosphoric or sulfuric acid. The term phosphoric acid, as used herein, and in the appended claims, is meant to include orthophosphoric, metaphosphoric, and pyrophosphoric acids. When prepared in the manner of the invention, as hereinafter disclosed, quinoline or quinoline compounds are obtained without employing common techniques of oxidation in the reaction process.

In an embodiment of the invention, the aniline compound, employed as a reactant may contain any substituted radical which will not interfere with the reaction process, such as hydroxy, alkyl, alkoxy, phenyl, halogen, or nitro radicals. The aniline compound must, however, be unsubstituted in at least one ortho position, in order to permit cyclization. Specific examples of aniline compounds that are suitable for use in the present invention are:

Aniline
Ortho-aminophenol
2-amino-4-chlorophenol
3-methylaniline
4-methylaniline
4-phenylaniline
4-nitroaniline The alpha-, beta-dihalo, saturated aliphatic compounds that are included within the scope of the invention, more particularly are represented by (I) aldehydes, (II) acetals, and (III) dicarboxylates, corresponding to the following general formulae:

(I) 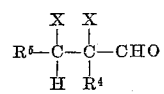

(II) 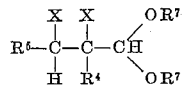

and (III) 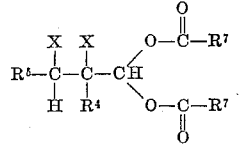

wherein $R^4$ and $R^5$ may be both hydrogen, both alkyl, or separately hydrogen and alkyl radicals, the alkyl radicals therein preferably being lower alkyl radicals containing from about 1 to 4 carbon atoms, $R^7$ represents an alkyl radical, preferably a lower alkyl radical as defined above, and X is a chlorine or bromine atom. Specific examples of these compounds are:

2,3-dibromopropionaldehyde
2,3-dibromobutyraldehyde
2,3-dibromo-2-methylpropionaldehyde
2,3-dichloropropionaldehyde
2,3-dibromopropionaldehyde diethyl acetal
2,3-dibromopropylidene diacetate
2,3-dichloropropylidene diacetate The synthesis of quinolines as herein described is most effectively performed at temperatures in the range of 90° C. to 140° C. Operation at temperatures between approximately 60° C. and 180° C., however, has been found satisfactory to the process. Experience has demonstrated that at these temperatures, the reaction period may vary from one-half to ten hours, while a period of from one to three hours is generally preferred.

The reactants are suitably introduced in a molar ratio of from approximately 1 to 8 moles of the aniline compound to 2 moles of the alpha, beta-dihalo compound. The relative amounts of the reactants may be varied, therefore, from a 300 percent excess of the aniline compound, to a 100 percent excess of the alpha-, beta-dihalo compound. Particularly good results are obtainable when the reactants are employed in a molar ratio of about 2 moles of the aniline compound to 1 mole of the alpha-, beta-dihalo compound.

The reaction may be carried out in the presence of either phosphoric or sulfuric acid, wherein the total weight of acid present is preferably twice the combined weight of the reactants. An operable range from this weight of acid is from one to twenty times the combined weight of the reactants. The acid employed may vary in initial concentration from approximately 40 percent to 100 percent.

At the conclusion of the reaction, the quinoline compound may be recovered by adding an aqueous solution of an alkali hydroxide, such as sodium or potassium hydroxide, to the reaction mixture in an amount sufficient to render the mixture alkaline, and subsequently isolating the desired product by steam distillation.

The following examples may better serve to illustrate the practice of the invention.

Example I 216 grams of 2,3-dibromopropionaldehyde (1 mole) were added, with constant stirring over a period of thirty minutes, to a mixture of 500 grams of 50 percent sulfuric acid and 93 grams of aniline (1 mole), at a temperature of between 113° C. and 115° C. After a reaction period of one hour at a temperature of 114° C. had elapsed, the mixture was poured into 1 liter of water. The aqueous mixture was then made alkaline by the addition of 33 percent sodium hydroxide and steam distilled at atmospheric pressure until an oil fraction no longer appeared in the condensate. The oil layer in the steam-distillate weighed 44 grams. The aqueous layer of the distillate, weighing 2756 grams, was extracted with 300 cc. of isopropyl ether. The oil layer and aqueous extract were then combined and fractionated to obtain pure quinoline having the following physical properties:

Boiling range: 80° C.–83° C./3 mm.
Refractive index/30° C.: 1.6215
Specific gravity, 20/20° C.: 1.097

The yield of quinoline was calculated to be 37 percent.

Example II 230 grams of 2,3-dibromobutyraldehyde (1 mole) were slowly added, with constant stirring, to a mixture of 500 grams of 50 percent sulfuric acid and 93 grams of aniline (1 mole), at a temperature of between 110° C. and 120° C. The reaction mixture was then refluxed at a temperature of 115° C. for an additional hour, diluted with one liter of water, and made alkaline (to a pH of 12) by the addition of 856 grams of 33 percent sodium hydroxide. The mixture was then distilled at atmospheric pressure, while water was added continuously in order to maintain a constant volume in the distillation vessel. A total of 2201 grams of distillate was collected over a period of seven hours. From this, 34 grams of an oil layer were separated. The remaining aqueous layer was extracted with 100 grams of butyl ether and combined with the oil. Subsequent distillation of the combined mixture under reduced pressure produced 30 grams of 2-methylquinoline, representing a 21 percent yield. The product had the following physical properties:

Boiling range: 85° C.–93° C./3 mm.
Refractive index/30° C.: 1.6058
Specific gravity 20/20° C.: 1.038

Example III

A mixture of 678 grams of 100 perecnt phosphoric acid and 93 grams of aniline (1 mole) was stirred and refluxed at a temperature of between 162° C. and 176° C., while 141 grams of 2,3-dichlorobutyraldehyde (1 mole) were slowly added thereto over a period of one hour. After a reaction period of three hours at a temperature of approximately 180° C., had elapsed, the mixture was cooled to a temperature of 100° C., and poured into one liter of water. The aqueous mixture was made alkaline by the addition of a 33 percent sodium hydroxide solution, and steam distilled until an oil layer no longer appeared in the distillate. The aqueous layer of the distillate, weighing 3032 grams, was extracted twice with 200 cc. portions of isopropyl ether, and the extracts therefrom combined with the oil layer of the distillate, weighing 23 grams. Fractionation of this mixture under reduced pressure led to the isolation of 2-methylquinoline having the following physical properties:

Boiling range: 93° C.–98° C./3 mm.
Refractive index/30° C.: 1.6088
Specific gravity, 20/20° C.: 1.117

The yield of 2-methylquinoline was calculated to be 16 percent.

Example IV

In the manner described in Example III, 141 grams of 2,3-dichloro-2-methylpropionaldehyde (1 mole) were added, over a period of one hour, to a mixture of 678 grams of 100 per cent phosphoric acid and 93 grams of aniline (1 mole) while refluxing the mixture at a temperature of between 144° C. and 170° C. After a reaction period of five hours at a temperature of approximately 180° C. had elapsed, the mixture was cooled, added to water, and made alkaline. Distillation of the mixture produced a condensate consisting of an oil layer weighing 8 grams and an aqueous layer weighing 1420 grams. The ether extract of the aqueous layer was combined with the oil fraction and the mixture was then fractionated to obtain 3-methylquinoline having the following physical properties:

Boiling range: 97° C.–99° C./3 mm.
Refractive index/30° C.: 1.6092
Specific gravity, 20/20° C.: 1.063

The yield of 3-methylquinoline was calculated to be 12 percent.

Example V 230 grams of freshly prepared 2,3-dibromo-2-methylpropionaldehyde (1 mole) was added over a period of 10 minutes, to a mixture of 500 grams of 85 percent phosphoric acid and 93 grams of aniline (1 mole), with constant stirring at a temperature of between 112° C. and 121° C. After a further reaction period of one hour at a temperature of 120° C., the mixture was diluted with one liter of water, and treated with 2000 grams of 33 percent sodium hydroxide solution, thereby increasing the pH of the solution to 12. The aqueous mixture was then distilled for four hours, with the addition of water to maintain constant volume. An aqueous layer of the distillate, weighing 2073 grams, was extracted with 100 grams of butyl ether, and the extract combined with the distillate oil fraction, weighing 40 grams. By subsequent fractionation thereof, a recovery of 38 grams of 3-methylquinoline, representing a 27 percent yield, was realized. The product exhibited the following physical properties:

Boiling range: 110° C.–122° C./6 mm.
Refractive index/30° C.: 1.6122
Specific gravity, 20/20° C.: 1.108

Example VI

To a mixture of 22 grams of ortho-aminophenol (0.20 mole) and 170 grams of 85 percent phosphoric acid, 32 grams of 2,3-dichloropropionaldehyde (0.25 mole) were added over a period of 20 minutes, while the mixture was stirred at a temperature of between 130° C. and 140° C. After the solution was stirred for an additional one and one-half hours at a temperature of 137° C., it was cooled to a temperature of 80° C., and poured into one liter of water. The mixture was then made weakly basic with 33 percent sodium hydroxide to liberate the free base from the acid salt. The alkaline mixture was subsequently steam distilled, and 9 grams of crystalline 8-quinolinol were recovered, representing a 31 percent yield. The product had a melting point of between 74° C. and 75° C., and there was no depression when a mixed melting point was taken with a sample of pure 8-quinolinol.

*Example VII*

A mixture of 11 grams of ortho-aminophenol (0.1 mole) and 170 grams of 85 percent phosphoric acid was stirred at a temperature of between 90° C. and 95° C., while 25 grams of 2,3-dichloropropylidene diacetate (0.11 mole) were added thereto over a period of 15 minutes. After continued stirring at a temperature of 100° C. for four and one half hours, the mixture was diluted with water and made weakly alkaline with 33 percent sodium hydroxide. Thereafter, the solution was steam-distilled and 1.2 grams of crystalline 8-quinolinol were recovered from the distillate. The yield of 8-quinolinol was calculated to be 8 percent.

*Example VIII*

While 50 ml. of 85 percent phosphoric acid were stirred at a temperature of 135° C., 32 grams of 2,3-dichloropropionaldehyde (0.3 mole) and a mixture of 29 grams of 2-amino-4-chlorophenol (0.2 mole) in 150 ml. of 85 percent phosphoric acid were added thereto separately and simultaneously over a period of about one-half an hour. After a reaction period of one hour at a temperature of 135° C. had elapsed, the reaction mixture was poured into a liter of water. The pH of the mixture was increased to 7 by the addition of 591 grams of 33 percent sodium hydroxide solution. The mixture was then steam-distilled at atmospheric pressure and 1.8 grams of crystalline 5-chloro-8-quinolinol subsequently recovered. The product was recrystallized from 70 ml. of hot methanol and crystals were obtained having a melting point of between 127° C. and 130° C. The yield of 5-chloro-8-quinolinol was calculated to be 5 percent.

*Example IX*

While a mixture of 29 grams of 2-amino-4-chlorophenol (0.2 mole) and 200 ml. of 85 percent phosphoric acid was stirred at a temperature of 135° C., 65 grams of 2,3-dibromopropionaldehyde (0.3 mole) were added over a period of approximately one-half an hour. After a reaction period of one hour at a temperature of 135° C. had elapsed, the mixture was poured into 2 liters of water and neutralized by the addition of 711 grams of a 33 percent sodium hydroxide solution. The mixture was steam-distilled at atmospheric pressure until crystals no longer remained in the condensate. The collected steam distillate was then cooled to a temperature of 10° C. and filtered. 3.2 grams of crystalline product 5-chloro-3-quinolinol was thereby obtained, having a melting point of between 115° C. and 117° C. The product yield was calculated to be 9 percent.

What is claimed is:

1. A process for the production of quinoline compounds corresponding to the general formula:

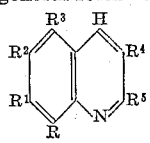

wherein R, R¹, R² and R³ each represent a member selected from the group consisting of hydrogen, hydroxy, alkyl, alkoxy, phenyl, halogen and nitro radicals, and R⁴ and R⁵ each represent a member selected from the group consisting of hydrogen and lower alkyl radicals, which process comprises reacting an aniline compound corresponding to the general formula:

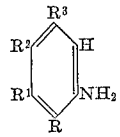

wherein R, R¹, R² and R³ are as defined above, with an alpha-, beta-dihalo saturated aliphatic compound corresponding to the general formula:

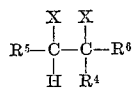

wherein R⁴ and R⁵ are as defined above, R⁶ represents a member selected from the group consisting of formyl, dialkoxymethyl and diacyloxymethyl radicals and X represents a halogen selected from the group consisting of bromine and chlorine atoms, in a ratio of from about 0.5 to about 4 moles of the aniline compound per mole of the alpha-, beta-dihalo saturated aliphatic compound, in the presence of a mineral acid selected from the group consisting of phosphoric and sulfuric acids and at a reaction temperature of between about 60° C. and about 180° C.

2. A process for the production of quinoline which comprises reacting aniline with 2,3-dichloropropionaldehyde in a ratio of from about 0.5 to about 4 moles of aniline per mole of 2,3-dichloropropionaldehyde, in the presence of a mineral acid selected from the group consisting of phosphoric and sulfuric acids, at a reaction temperature of between about 60° C. and about 180° C. and recovering the quinoline product thereby formed.

3. A process for the production of quinoline which comprises reacting aniline with 2,3-dibromopropionaldehyde in a ratio of from about 0.5 to about 4 moles of aniline per mole of 2,3-dibromopropionaldehyde, in the presence of a mineral acid selected from the group consisting of phosphoric and sulfuric acids, at a reaction temperature of between about 60° C. and about 180° C. and recovering the quinoline product thereby formed.

4. A process for the production of 8-hydroxyquinoline which comprises reacting 2-aminophenol with 2,3-dichloropropionaldehyde in a ratio of from about 0.5 to about 4 moles of 2-aminophenol per mole of 2,3-dichloropropionaldehyde in the presence of a mineral acid selected from the group consisting of phosphoric and sulfuric acids, at a reaction temperature of between about 60° C. and about 180° C. and recovering the 8-hydroxyquinoline product thereby formed.

5. A process for the production of 8-hydroxyquinoline which comprises reacting 2-aminophenol with 2,3-dichloropropylidene-1,1-diacetate in a ratio of from about 0.5 to about 4 moles of 2-aminophenol per mole of 2,3-dichloropropylidene-1,1-diacetate, in the presence of a mineral acid selected from the group consisting of phosphoric and sulfuric acids, at a reaction temperature of between about 60° C. and about 180° C. and recovering the 8-hydroxyquinoline product thereby formed.

6. A process for the production of 2-methylquinoline which comprises reacting aniline with 2,3-dichlorobutyraldehyde in a ratio of from about 0.5 to about 4 moles of aniline per mole of 2,3-dichlorobutyraldehyde in the presence of a mineral acid selected from the group consisting of phosphoric and sulfuric acids, at a reaction temperature in the range of between about 60° C. and 180° C. and recovering the 2-methylquinoline product thereby formed.

7. A process for the production of 2-methylquinoline which comprises reacting aniline with 2,3-dibromobutyraldehyde in a ratio of from about 0.5 to about 4 moles of aniline per mole of 2,3-dibromobutyraldehyde in the presence of a mineral acid selected from the group consisting of phosphoric and sulfuric acids, at a reaction temperature in the range of between about 60° C. and 180° C. and recovering the 2-methylquinoline product thereby formed.

References Cited in the file of this patent
UNITED STATES PATENTS 2,608,557    Copenhaver _____ Aug. 26, 1952